US012763068B2

(12) United States Patent
Morikawa et al.

(10) Patent No.: US 12,763,068 B2
(45) **Date of Patent: *Oct. 13, 2026**

(54) TRAINING DEVICE, ESTIMATION DEVICE, TRAINING METHOD, ESTIMATION METHOD, TRAINING PROGRAM, AND ESTIMATION PROGRAM

(71) Applicant: NTT, Inc., Tokyo (JP)

(72) Inventors: Akira Morikawa, Musashino (JP); Ryo Ishii, Musashino (JP); Hajime Noto, Musashino (JP)

(73) Assignee: NTT, Inc., Tokyo (JP)

(*) Notice: Subject to any disclaimer, the term of this patent is extended or adjusted under 35 U.S.C. 154(b) by 148 days.

This patent is subject to a terminal disclaimer.

(21) Appl. No.: 18/840,512

(22) PCT Filed: Feb. 24, 2022

(86) PCT No.: PCT/JP2022/007726

§ 371 (c)(1),
(2) Date: Aug. 22, 2024

(87) PCT Pub. No.: WO2023/162107

PCT Pub. Date: Aug. 31, 2023

(65) Prior Publication Data

US 2025/0166613 A1 May 22, 2025

(51) Int. Cl.
*G10L 15/00* (2013.01)
*G10L 15/06* (2013.01)
*G10L 15/08* (2006.01)

(52) U.S. Cl.
CPC ........... *G10L 15/063* (2013.01); *G10L 15/08* (2013.01)

(58) Field of Classification Search
USPC .......................................................... 704/243
See application file for complete search history.

(56) References Cited

U.S. PATENT DOCUMENTS

| | | | | |
|---|---|---|---|---|
| 2020/0312352 | A1* | 10/2020 | Kamiyama | G06N 3/0442 |
| 2020/0372915 | A1* | 11/2020 | Ishii | G10L 15/24 |
| 2020/0401794 | A1* | 12/2020 | Ishii | G10L 13/08 |
| 2021/0370519 | A1* | 12/2021 | Ishii | G10L 21/06 |
| 2022/0093094 | A1* | 3/2022 | Krishnan | G06V 10/40 |
| 2022/0093101 | A1* | 3/2022 | Krishnan | G06F 18/24 |

(Continued)

FOREIGN PATENT DOCUMENTS

JP 2018-022075 A 2/2018

OTHER PUBLICATIONS

Ryosuke Ueno et al., "Estimating Feedback Responses and the Intensity of Facial Expressions based on Multimodal Information", The 35th Annual Conference of the Japanese Society for Artificial Intelligence 2021, pp. 1-4 (4 pages including English Abstract).

*Primary Examiner* — Satwant K Singh
(74) *Attorney, Agent, or Firm* — XSENSUS LLP

(57) ABSTRACT

A learning device includes processing circuitry configured to acquire speech data of a speaker, information on the speaker, conversation data of a listener, information on the listener, and a classification label of a quick response included in the conversation data of the listener, and create a learned model of estimating a type of the quick response of the listener to a conversation of the speaker using the information acquired with the classification label of the quick response as correct answer data.

6 Claims, 8 Drawing Sheets

(56) References Cited

U.S. PATENT DOCUMENTS

| | | | | |
|---|---|---|---|---|
| 2022/0115001 | A1* | 4/2022 | Bratt | G10L 13/10 |
| 2025/0182742 | A1* | 6/2025 | Morikawa | G10L 13/027 |
| 2025/0191576 | A1* | 6/2025 | Morikawa | G06F 3/167 |
| 2025/0245506 | A1* | 7/2025 | Yun | G10L 15/16 |

* cited by examiner

Fig. 5

| ABBREVIATION SYMBOL | CLASSIFICATION NAME | DEFINITION | SPEECH EXAMPLE |
|---|---|---|---|
| P | Positive | POSITIVE RESPONSE TO SPEAKER | "YES, YES" "YEAH, YEAH" "GOOD" "I SEE" "TRUE" |
| N | Neutral | RESPONSE NOT INCLUDING EMOTION TO SPEAKER | "YEAH" "YES" "OH" |
| NP | Non-positive | NEGATIVE OR WORRIED RESPONSE (INCLUDING FILLER) | "OOH" "HMM" "HAH" "UH" "UH-HUH" "UMM" |
| E | Emotional word | RESPONSE INDICATING MOVEMENT OF EMOTION | "GREAT" "HEHEHE" "AH" "UH-HUH" OR OTHER SHORT EXCLAMATION |
| C | Confirmation | RESPONSE TO REPEAT SPEAKER'S SPEECH | "WHAT" "HA" "AH" "WHY" OR WORDING TO CONFIRM |
| R | Repetition of Speaker's utterance word | RESPONSE TO REPEAT SPEAKER'S SPEECH (CASE WHERE WORDS DO NOT COMPLETELY MATCH IS ALLOWABLE, BUT REPHRASING IS NOT INCLUDED) | REPETITION OF SPEECH OF SPEAKER |
| A | Speak a word before speaker's speaking | RESPONSE TO CONTENT NOT ALREADY SPOKEN BY SPEAKER, AND PROVISION OF TOPIC FROM LISTENER | TOPIC OF SPEAKER IN ADVANCE |
| S | Summarize speaker's speaking | SUMMARIZATION AND REPHRASING OF SPEAKER'S SPEECH | SUMMARIZATION OF SPEECH OF SPEAKER |

TRAINING DEVICE, ESTIMATION DEVICE, TRAINING METHOD, ESTIMATION METHOD, TRAINING PROGRAM, AND ESTIMATION PROGRAM

CROSS-REFERENCE TO RELATED APPLICATION

This application is a national stage application, pursuant to 35 U.S.C. § 371, of International Patent Application No. PCT/JP2022/007726, filed Feb. 24, 2022, the entire contents of which is incorporated herein by reference.

TECHNICAL FIELD

The present invention relates to a learning device, an estimation device, a learning method, an estimation method, a learning program, and an estimation program.

BACKGROUND ART

There is a conventional technology of a conversation system that generates a speech responding to a speech of a user and achieves smooth interaction between the user and the system. In such a conversation system, quick response is an important element, and for example, there is a technology of randomly generating a quick response (for example, see Patent Literature 1).

CITATION LIST

Patent Literature

Patent Literature 1: Japanese Laid-open Patent Publication No. 2018-22075 A

SUMMARY OF INVENTION

Technical Problem

However, the conventional technology has a problem that a more natural quick response cannot be generated as a listener. For example, in the conventional technology, there is a limit to performing a speech at an appropriate timing, and there is a problem that the content of the speech is far from a natural quick response.

The present invention has been made in view of the above, and an object thereof is to provide a learning device, an estimation device, a learning method, an estimation method, a learning program, and an estimation program capable of generating a more natural quick response as a listener.

Solution to Problem

In order to solve the above-described problems and achieve the object, a learning device includes: processing circuitry configured to: acquire speech data of a speaker, information on the speaker, conversation data of a listener, information on the listener, and a classification label of a quick response included in the conversation data of the listener; and create a learned model of estimating a type of the quick response of the listener to a conversation of the speaker using the information acquired with the classification label of the quick response as correct answer data.

In addition, an estimation device includes: processing circuitry configured to: acquire speech data of a speaker, information on the speaker, conversation data of a listener, and information on the listener; and input the information acquired as input data to a learned model of estimating a type of a quick response of the listener to a conversation of the speaker and estimate the type of the quick response of the listener to the conversation of the speaker.

Advantageous Effects of Invention

According to the present invention, it is possible to generate a more natural quick response as a listener.

BRIEF DESCRIPTION OF DRAWINGS

FIG. 5 is a diagram exemplifying a type of quick response.

DESCRIPTION OF EMBODIMENTS

Hereinafter, embodiments of a learning device, an estimation device, a learning method, an estimation method, a learning program, and an estimation program according to the present application will be described in detail with reference to the drawings. Moreover, the present invention is not limited to the embodiment described below.

Figure 1:
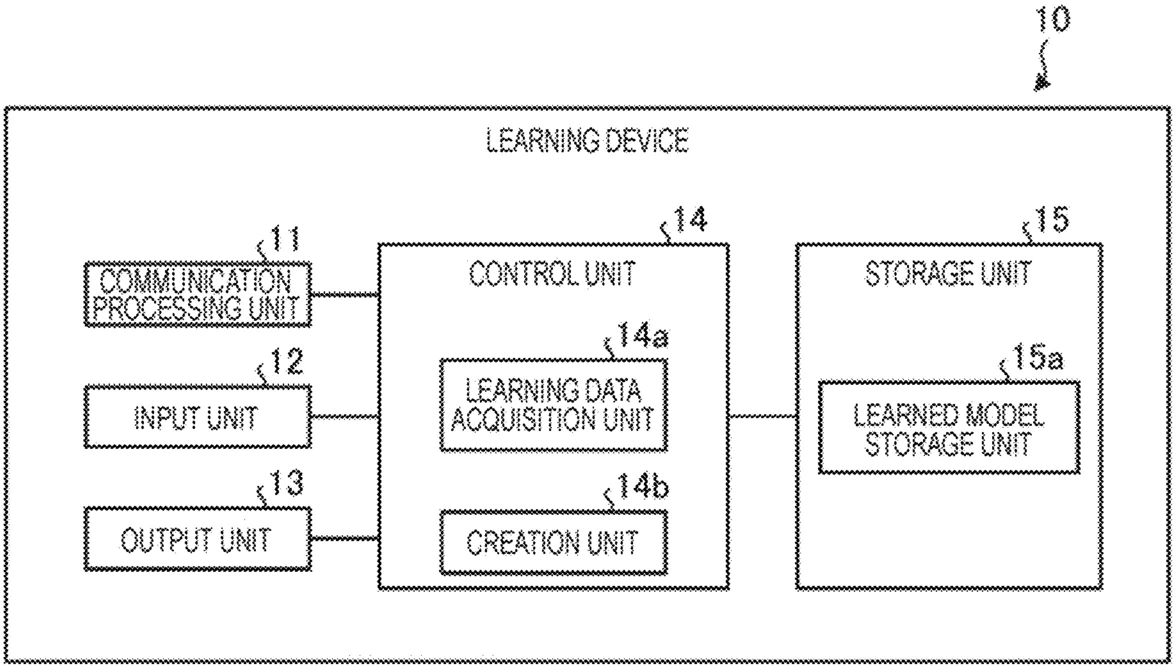
FIG. 1 is a block diagram illustrating a configuration of a learning device of the present embodiment.

[Configuration of Learning Device] FIG. 1 is a block diagram illustrating a configuration of a learning device of the present embodiment. As illustrated in FIG. 1, a learning device 10 of the present embodiment includes a communication processing unit 11, an input unit 12, an output unit 13, a control unit 14, and a storage unit 15.

The communication processing unit 11 is implemented by a network interface card (NIC) or the like, and controls communication via an electric communication line such as a local area network (LAN) or the Internet.

The input unit 12 is implemented by using an input device such as a keyboard or a mouse and inputs various types of instruction information such as processing start to the control unit 14 in response to an input operation by an operator. The output unit 13 is implemented by a display device such as a liquid crystal display.

The storage unit 15 stores data and programs necessary for various types of processing by the control unit 14, and includes a learned model storage unit 15*a*. For example, the storage unit 15 is a semiconductor memory element such as a random access memory (RAM) or a flash memory, or a storage device such as a hard disk or an optical disk.

The learned model storage unit 15*a* stores a learned model learned by the creation unit 14*b* to be described later. For example, the learned model storage unit 15*a* stores, as a learned model, a classifier for estimating a type of a quick response of a listener to a conversation of a speaker.

The control unit 14 includes an internal memory for storing a program defining various processing procedures and the like and required data, and executes various types of processing using the program and the data. For example, the control unit 14 includes a learning data acquisition unit 14*a* and a creation unit 14*b*. Here, the control unit 14 is an electronic circuit such as a central processing unit (CPU) or a micro processing unit (MPU), or an integrated circuit such as an application specific integrated circuit (ASIC) or a field programmable gate array (FPGA).

The learning data acquisition unit 14*a* acquires the speech data of the speaker and the information on the speaker, the conversation data of the listener and the information on the listener, and the classification label of the quick response included in the conversation data of the listener. For example, the learning data acquisition unit 14*a* acquires any one or more of the expression, the motion, and the voice of the speaker as the information on the speaker, and acquires any one or more of the expression, the motion, and the voice of the speaker as the information on the listener. The learning data acquisition unit 14*a* may acquire, for example, image data of the face of the speaker or the entire speaker, or may acquire information such as the expression "smile" or the motion "absence" as the information of the expressions and the motions of the speaker and the listener.

The creation unit 14*b* uses the information acquired by the learning data acquisition unit 14*a* to create a learned model of estimating a type of a quick response of the listener to the conversation of the speaker using the classification label of the quick response as correct answer data. That is, the creation unit 14*b* creates a learned model of estimating the type of quick response included in the speech of both the speaker and the listener and the conversation data of the listener. The creation unit 14*b* may use any method using the model as a learning method. Here, the quick response included in the conversation data of the listener is, for example, a speech such as "yes, yes, yes", "yeah, yeah", "good", "I see", "true", "yeah", "yes", "oh", "ooh", "hmm", "great", or "what" included in the conversation data. Thereafter, the creation unit 14*b* stores the created learned model in the learned model storage unit 15*a*.

Figure 2:
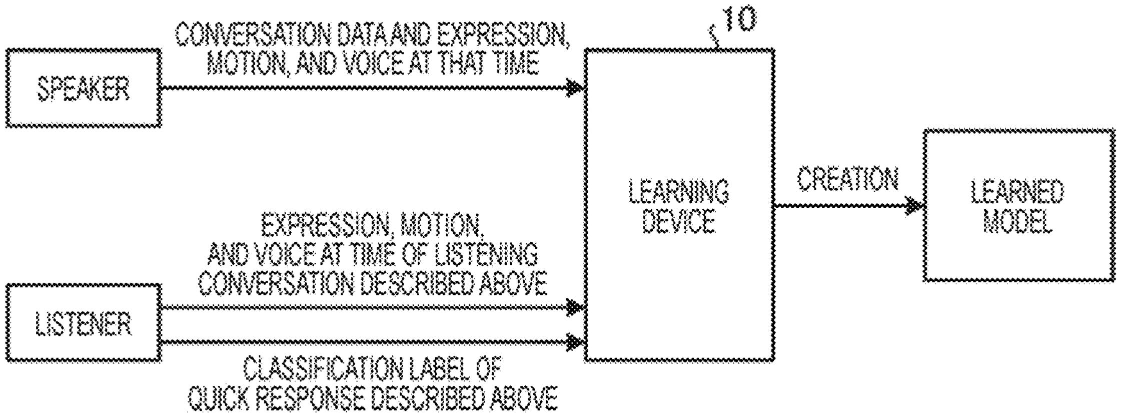
FIG. 2 is a diagram illustrating processing of creating a learned model.

Here, processing of creating a learned model will be described with reference to FIG. 2. FIG. 2 is a diagram illustrating processing of creating a learned model. As illustrated in FIG. 2, the learning device 10 uses, as inputs, conversation data of a speaker and a listener, various types of information (expression, motion, voice, or the like) of both of them at the time of conversation, and a classification label of a quick response of the listener, and creates a learned model of determining the type into which the quick response of the listener is classified, from the conversation contents of the speaker and the listener.

Figure 3:
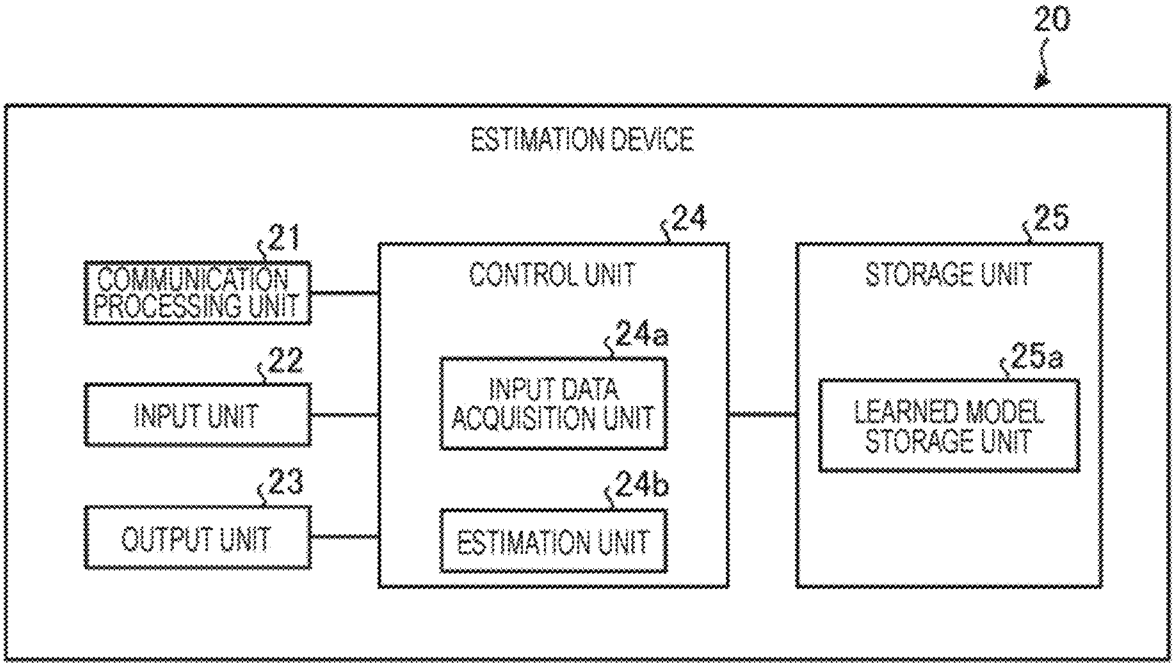
FIG. 3 is a block diagram illustrating a configuration of an estimation device of the present embodiment.

[Configuration of Estimation Device] FIG. 3 is a block diagram illustrating a configuration of an estimation device of the present embodiment. As illustrated in FIG. 3, the estimation device 20 of the present embodiment includes a communication processing unit 21, an input unit 22, an output unit 23, a control unit 24, and a storage unit 25.

The communication processing unit 21 is implemented by an NIC or the like, and controls communication via a telecommunication line such as a LAN or the Internet. The input unit 22 is implemented by using an input device such as a keyboard or a mouse and inputs various types of instruction information such as processing start to the control unit 24 in response to an input operation by an operator. The output unit 23 is implemented by a display device such as a liquid crystal display.

The storage unit 25 stores data and programs necessary for various types of processing by the control unit 24, and includes a learned model storage unit 25*a*. For example, the storage unit 25 is a semiconductor memory element such as a random access memory (RAM) or a flash memory, or a storage device such as a hard disk or an optical disk.

The learned model storage unit 25*a* stores a learned model learned by the creation unit 14*b*. For example, the learned model storage unit 25*a* stores, as a learned model, a classifier for estimating a type of a quick response of a listener to a conversation of a speaker.

The control unit 24 includes an internal memory for storing a program defining various processing procedures and the like and required data, and executes various types of processing using the program and the data. For example, the control unit 24 includes an input data acquisition unit 24*a* and an estimation unit 24*b*. Here, the control unit 24 is an electronic circuit such as a central processing unit (CPU) or a micro processing unit (MPU), or an integrated circuit such as an application specific integrated circuit (ASIC) or a field programmable gate array (FPGA).

The input data acquisition unit 24*a* acquires the speech data of the speaker and the information on the speaker, and the conversation data of the listener and the information on the listener. For example, the input data acquisition unit 24*a* acquires any one or more of the expression, the motion, and the voice of the speaker as the information on the speaker, and acquires any one or more of the expression, the motion, and the voice of the speaker as the information on the listener.

The estimation unit 24*b* inputs the information acquired by the input data acquisition unit 24*a* as input data to a learned model of estimating a type of a quick response of the listener to the conversation of the speaker, and estimates the type of the quick response of the listener with respect to the conversation of the speaker. Then, the estimation unit 24*b* outputs the classified type of quick response.

Figure 4:
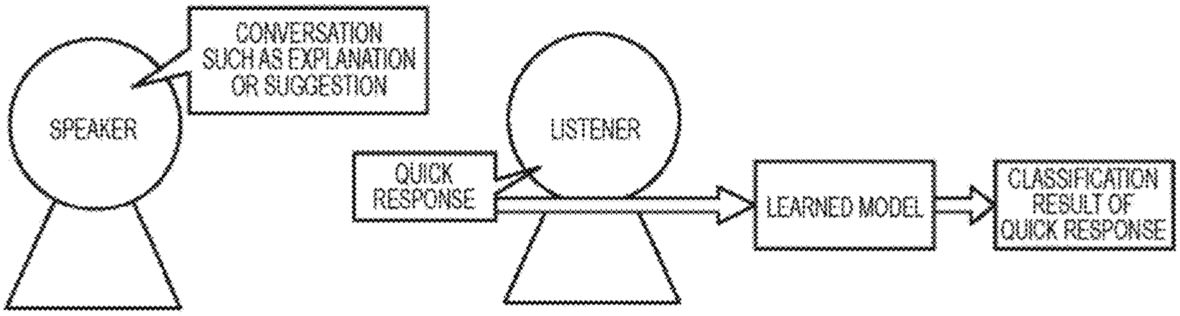
FIG. 4 is a diagram illustrating processing of estimating a type of a quick response of a listener to a conversation of a speaker.

Here, processing of estimating a type of a quick response of a listener to a conversation of a speaker will be described with reference to FIG. 4. FIG. 4 is a diagram illustrating processing of estimating a type of a quick response of a listener to a conversation of a speaker. As illustrated in FIG. 4, the estimation device 20 inputs a multimodal including the speech of the speaker (speech, speech sentence, or the like) and a multimodal including the quick response of the listener (speech, speech sentence, or the like) to the learned model, and outputs eight types of classification results for the quick response of the listener.

For example, as illustrated in FIG. 5, the estimation unit 24*b* of the estimation device 20 estimates the type of the quick response among eight preset types. In the example of FIG. 5, as the type of quick response, "positive response to the speaker", "response not including emotion to the speaker", "negative or worried response", "response indicating movement of emotion", "response to repeat the speaker's speech", and "response to repeat the speaker's speech (a case where words do not completely match is allowable, but rephrasing is not included), "response to a content not already spoken by the speaker, and provision of topic from the listener", and "summarization and rephrasing of the speaker's speech" are set. The types of quick response are not limited to these eight types, and the number of types is also not limited to eight.

As a result, the estimation device 20 systematically classifies speeches indicating a wide variety of modes, that is, quick responses, which can be useful for improving mutual understanding in communication and improving the accuracy of dialogue analysis. That is, for example, there are many quick responses having different meanings even having the same syllable, and there is a large difference in nuances due to language and culture, which often causes misunderstanding. Therefore, the estimation device 20 can clarify the emotion and intention of the speaker of the quick response by systematizing and classifying the quick response spoken by the listener. Furthermore, for example, if there is a system in which the estimation device 20 classifies and displays quick responses in real time, the speaker can accurately understand the emotion and intention of the listener. Also in the analysis of the dialogue, when the estimation device 20 performs the classification of quick response, it is possible to more clearly grasp the clarification of the intention and the change in the state of mind not included in the speech.

Figure 6:
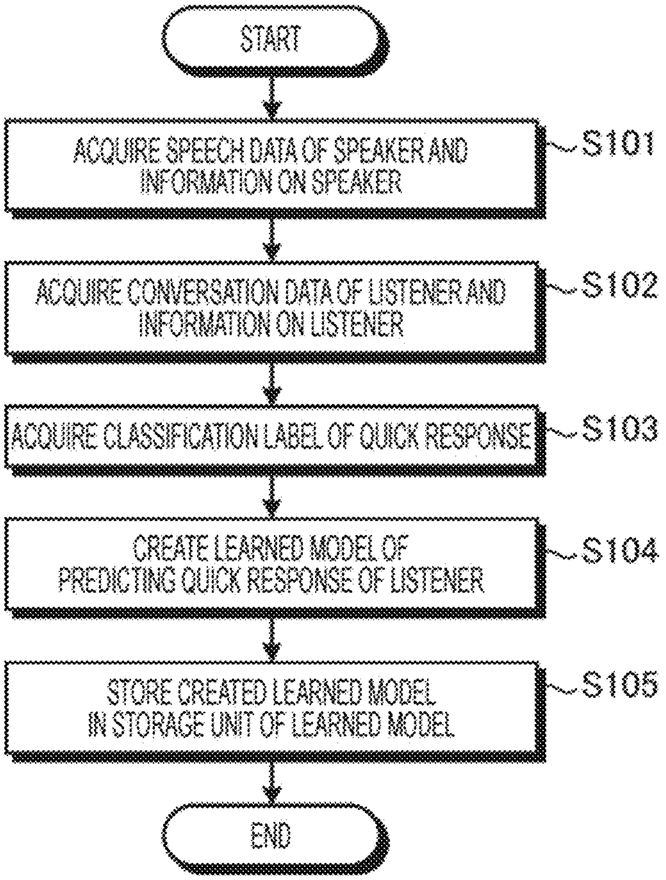
FIG. 6 is a flowchart illustrating an example of a processing procedure of a learning processing.

[Processing Procedure by Learning Device] Next, an example of a processing procedure of processing executed by the learning device 10 will be described with reference to FIG. 6. FIG. 6 is a flowchart illustrating an example of a processing procedure of pre-processing.

As illustrated in FIG. 6, the learning data acquisition unit 14*a* of the learning device 10 acquires speech data of a speaker and information on the speaker (step S101). Then, the learning data acquisition unit 14*a* acquires conversation data of the listener and information on the listener (step S102). Subsequently, the learning data acquisition unit 14*a* acquires the classification label of the quick response (step S103).

The creation unit 14*b* uses the information acquired by the learning data acquisition unit 14*a* to create a learned model of classifying a quick response of the listener to the conversation of the speaker using the classification label of the quick response as correct answer data (step S104). Thereafter, the creation unit 14*b* stores the created learned model in the learned model storage unit 15*a* (step S105).

Figure 7:
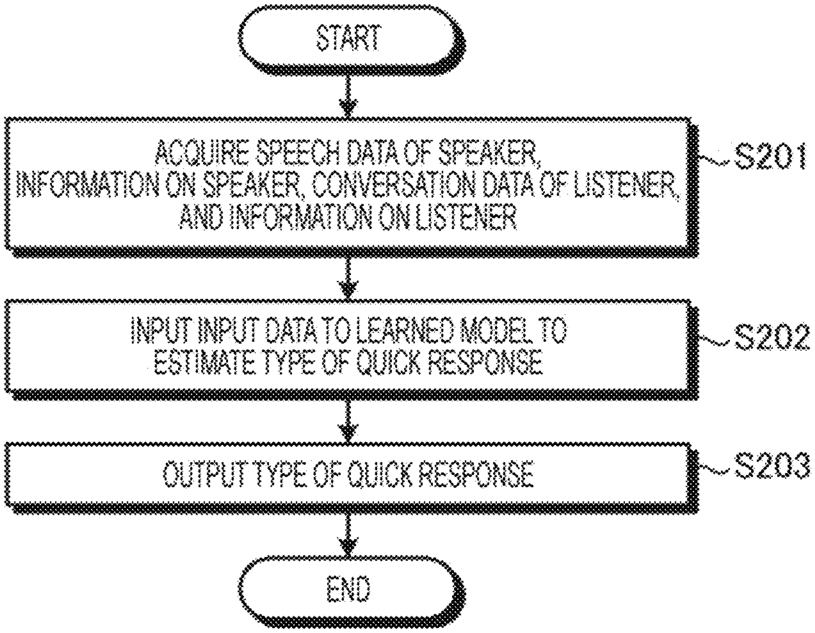
FIG. 7 is a flowchart illustrating an example of a processing procedure of estimation processing.

[Processing Procedure by Estimation Device] Next, an example of a processing procedure of processing executed by the estimation device 20 will be described with reference to FIG. 7. FIG. 7 is a flowchart illustrating an example of a processing procedure of estimation processing.

As illustrated in FIG. 7, the input data acquisition unit 24*a* of the estimation device 20 acquires the speech data of the speaker, the information on the speaker, the conversation data of the listener, and the information on the listener as input data (step S201). Then, the estimation unit 24*b* inputs the input data to the learned model, specifies the type of the quick response (step S202), and outputs the type of the quick response (step S203).

[Effects of Embodiment] As described above, the learning device 10 according to the embodiment acquires speech data of a speaker and information on the speaker, conversation data of a listener and information on the listener, and a classification label of a quick response included in the conversation data of the listener, and creates a learned model of estimating a type of the quick response of the listener to a conversation of the speaker using the acquired information with the classification label of the quick response as correct answer data. For this reason, the learning device 10 learns the classification of the content of the quick response spoken by the listener with respect to the speech of the speaker, so that it is possible to appropriately classify the content of the quick response, and it is possible to use it for generating an appropriate quick response.

The estimation device 20 acquires speech data of a speaker, information on the speaker, conversation data of a listener, and information on the listener, and inputs the acquired information as input data to a learned model of estimating a type of a quick response of the listener to a conversation of the speaker and estimates the type of the quick response of the listener to the conversation of the speaker. Therefore, the estimation device 20 can appropriately classify the content of the quick response, and can generate a more natural quick response as a listener by helping to generate an appropriate quick response.

[System Configuration and the Like]

Each component of each device illustrated according to the above embodiments is functionally conceptual and does not necessarily have to be physically configured as illustrated. That is, a specific form of distribution and integration of each device is not limited to the illustrated form, and all or a part thereof can be functionally or physically distributed and integrated in any unit according to various loads, usage conditions, and the like. Furthermore, all or any part of the processing functions performed in each device can be implemented by a CPU and a program analyzed and executed by the CPU, or can be implemented as hardware by wired logic.

Furthermore, among the processing described in the above embodiments, all or a part of the processing described as being automatically performed can be manually performed, or all or a part of the processing described as being manually performed can be automatically performed by a known method. In addition, the processing procedures, the control procedures, the specific names, and the information including various data and parameters illustrated in the above document and drawings can be arbitrarily changed unless otherwise specified.

[Program]

In addition, it is also possible to create a program in which the processing to be executed by the learning device 10 or the estimation device 20 described in the embodiment described above is described in a language that can be executed by a computer. In this case, the computer executes the program, and thus the effects similar to those of the above embodiments can be obtained. Furthermore, the program may be recorded in a computer-readable recording medium, and the program recorded in the recording medium may be read and executed by the computer to implement processing similar to that of the above embodiments.

Figure 8:
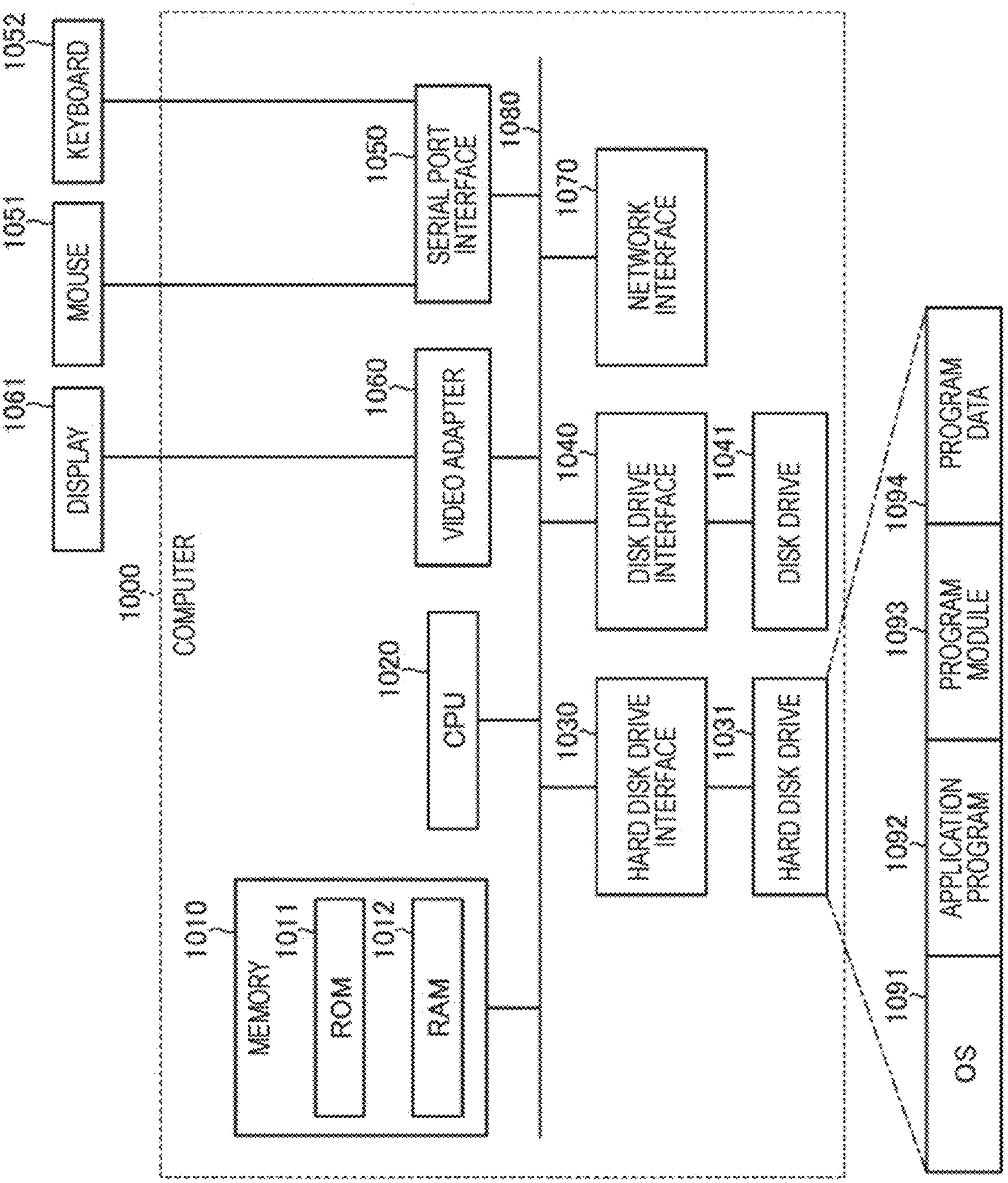
FIG. 8 is a diagram illustrating a computer that executes a program.

FIG. 8 is a diagram illustrating a computer that executes a program. As exemplified in FIG. 8, a computer 1000 includes, for example, memory 1010, a CPU 1020, a hard disk drive interface 1030, a disk drive interface 1040, a serial port interface 1050, a video adapter 1060, and a network interface 1070, and these units are connected by a bus 1080.

As exemplified in FIG. 8, the memory 1010 includes a read only memory (ROM) 1011 and a RAM 1012. The ROM 1011 stores, for example, a boot program such as a basic input output system (BIOS). The hard disk drive interface 1030 is connected to a hard disk drive 1031 as illustrated in FIG. 8. The disk drive interface 1040 is connected to a disk drive 1041 as illustrated in FIG. 8. For example, a removable storage medium such as a magnetic disk or an optical disc is inserted into the disk drive 1041. As illustrated in FIG. 8, the serial port interface 1050 is connected to, for example, a mouse 1051 and a keyboard 1052. As illustrated in FIG. 8, the video adapter 1060 is connected to, for example, a display 1061.

Here, as illustrated in FIG. 8, the hard disk drive 1031 stores, for example, an OS 1091, an application program 1092, a program module 1093, and program data 1094. That is, the above program is stored as a program module in which a command executed by the computer 1000 is described, for example, in the hard disk drive 1031.

In addition, various data described in the above embodiments is stored as program data in, for example, the memory 1010 and the hard disk drive 1031. The CPU 1020 then reads the program module 1093 and the program data 1094 stored in the memory 1010 and the hard disk drive 1031 to the RAM 1012 as necessary, and executes various processing procedures.

Note that the program module 1093 and the program data 1094 related to the program are not limited to being stored in the hard disk drive 1031, and may be stored in, for example, a removable storage medium and read by the CPU 1020 via the disk drive or the like. Alternatively, the program module 1093 and the program data 1094 related to the program may be stored in another computer connected via a network (such as a local area network (LAN) or a wide area network (WAN)) and read by the CPU 1020 via the network interface 1070.

Although the embodiments to which the invention made by the present inventor is applied have been described above, the present invention is not limited by the description and drawings constituting a part of the disclosure of the present invention according to the present embodiments. In other words, other embodiments, examples, operational techniques, and the like made by those skilled in the art or the like on the basis of the present embodiment are all included in the scope of the present invention.

REFERENCE SIGNS LIST

10 Learning device
11, 21 Communication processing unit
12, 22 Input unit
13, 23 Output unit
14, 24 Control unit
**14*a*** Learning data acquisition unit
**14*b*** Creation unit
15, 25 Storage unit
**15*a*, 25*a*** Learned model storage unit
**24*a*** Input data acquisition unit
**24*b*** Estimation unit

The invention claimed is:

1. A learning device comprising:
processing circuitry configured to:
obtain first multimodal data of utterances, wherein the first multimodal data includes one or more expressions, actions, and voices of speakers;
obtain second multimodal data of backchannel responses, wherein the second multimodal data includes one or more expressions, actions, and voices of listeners;
obtain classification data including classification labels associated with the backchannel responses, wherein each classification label indicates one of (i) a positive response, (ii) a neutral response, (iii) a non-positive response, (iv) an emotional word, (v) a confirmation, (vi) a repetition of a speaker's utterance, (vii) a response providing a topic, and (viii) a summarization or paraphrase of a speaker's utterance; and
train, using the first multimodal data, the second multimodal data, and the classification data, a model, wherein the first and second multimodal data are used as training input, and the classification data is used as training output.

2. The learning device according to claim 1, wherein the backchannel responses include at least one of “yes, yes, yes,” “yeah, yeah,” “good,” “I see,” “true,” “yeah,” “yes,” “oh,” “ooh,” “hmm,” “great,” and “what”.

3. A learning method performed by a learning device, the learning method comprising:
obtaining first multimodal data of utterances, wherein the first multimodal data includes one or more expressions, actions, and voices of speakers;
obtaining second multimodal data of backchannel responses, wherein the second multimodal data includes one or more expressions, actions, and voices of listeners;
obtaining classification data including classification labels associated with the backchannel responses, wherein each classification label indicates one of (i) a positive response, (ii) a neutral response, (iii) a non-positive response, (iv) an emotional word, (v) a confirmation, (vi) a repetition of a speaker's utterance, (vii) a response providing a topic, and (viii) a summarization or paraphrase of a speaker's utterance; and
training, using the first multimodal data, the second multimodal data, and the classification data, a model, wherein the first and second multimodal data are used as training input, and the classification data is used as training output.

4. The learning method according to claim 3, wherein the backchannel responses include at least one of “yes, yes, yes,” “yeah, yeah,” “good,” “I see,” “true,” “yeah,” “yes,” “oh,” “ooh,” “hmm,” “great,” and “what”.

5. A non-transitory computer-readable recording medium storing therein a learning program that causes a computer to execute a process comprising:
obtaining first multimodal data of utterances, wherein the first multimodal data includes one or more expressions, actions, and voices of speakers;
obtaining second multimodal data of backchannel responses, wherein the second multimodal data includes one or more expressions, actions, and voices of listeners;
obtaining classification data including classification labels associated with the backchannel responses, wherein each classification label indicates one of (i) a positive response, (ii) a neutral response, (iii) a non-positive response, (iv) an emotional word, (v) a confirmation, (vi) a repetition of a speaker's utterance, (vii) a response providing a topic, and (viii) a summarization or paraphrase of a speaker's utterance; and
training, using the first multimodal data, the second multimodal data, and the classification data, a model, wherein the first and second multimodal data are used as training input, and the classification data is used as training output.

6. The non-transitory computer-readable recording medium according to claim 5, wherein the backchannel responses include at least one of “yes, yes, yes,” “yeah, yeah,” “good,” “I see,” “true,” “yeah,” “yes,” “oh,” “ooh,” “hmm,” “great,” and “what”.

* * * * *